(12) United States Patent
Tanaka et al.

(10) Patent No.: US 9,273,574 B2
(45) Date of Patent: *Mar. 1, 2016

(54) EXHAUST GAS PURIFYING FILTER

(75) Inventors: Masamichi Tanaka, Tokyo (JP); Atsushi Kishimoto, Tokyo (JP); Tadashi Neya, Tokyo (JP); Keita Ishizaki, Utsunomiya (JP)

(73) Assignees: SUMITOMO OSAKA CEMENT CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 233 days.

This patent is subject to a terminal disclaimer.

(21) Appl. No.: 13/499,002

(22) PCT Filed: Sep. 30, 2010

(86) PCT No.: PCT/JP2010/067134
§ 371 (c)(1),
(2), (4) Date: Mar. 29, 2012

(87) PCT Pub. No.: WO2011/040561
PCT Pub. Date: Apr. 7, 2011

(65) Prior Publication Data
US 2012/0186240 A1    Jul. 26, 2012

(30) Foreign Application Priority Data
Sep. 30, 2009  (JP) ................................ 2009-228767

(51) Int. Cl.
*F01N 3/022*  (2006.01)
*B01D 46/24*  (2006.01)

(52) U.S. Cl.
CPC ...... *F01N 3/0222* (2013.01); *B01D 2046/2437* (2013.01); *B01D 2275/30* (2013.01); *B01D 2279/30* (2013.01); *Y02T 10/20* (2013.01)

(58) Field of Classification Search
CPC ... B01J 27/224; B01J 2523/41; F01N 3/0222; Y02T 10/26

USPC ...................... 60/295, 311; 55/522–524, 486; 422/169–172, 177–182
See application file for complete search history.

(56) References Cited

U.S. PATENT DOCUMENTS 4,352,120 A * 9/1982 Kurihara et al. ............... 257/705
4,835,017 A * 5/1989 Ishikawa et al. ............... 427/379

(Continued)

FOREIGN PATENT DOCUMENTS

JP  02-002845 A  1/1990
JP  02-004413 A  1/1990

(Continued)

OTHER PUBLICATIONS

Machine Translation of JP 2001072479 A.*

(Continued)

*Primary Examiner* — Jason Shanske
*Assistant Examiner* — Brandon Lee
(74) *Attorney, Agent, or Firm* — Squire Patton Boggs (US) LLP

(57) ABSTRACT

According to the present invention, there is provided an exhaust gas purifying filter capable of effectively removing collected particulate matter. An exhaust gas purifying filter of the present invention includes an inflow surface into which exhaust gas including particulate matter flows, an exhaust surface which exhausts purified gas, and a filter substrate which is constructed of a porous body, wherein the filter substrate includes porous partitions and gas passages which are enclosed by the partitions, and a porous film, which includes silicon carbide and pores having a smaller pore diameter than the pores of the partitions, is provided on the surface of the partitions, and a silicon dioxide layer is formed on at least an outer surface portion of the porous film.

14 Claims, 3 Drawing Sheets

(56) References Cited

U.S. PATENT DOCUMENTS

| | | | |
|---|---|---|---|
| 5,198,007 A * | 3/1993 | Moyer et al. ................... 55/523 |
| 5,221,484 A | 6/1993 | Goldsmith et al. |
| 5,578,129 A * | 11/1996 | Moriya ......................... 118/719 |
| 5,858,523 A * | 1/1999 | Kawai et al. ................ 428/312.6 |
| 6,803,015 B2 * | 10/2004 | Vance et al. .................. 264/628 |
| 7,179,430 B1 | 2/2007 | Stobbe et al. |
| 8,361,399 B2 | 1/2013 | Mizuno et al. |
| 8,388,721 B2 | 3/2013 | Ishizawa |
| 8,657,914 B2 * | 2/2014 | Tanaka et al. .................. 55/524 |
| 2004/0191133 A1 | 9/2004 | Yamaguchi |
| 2005/0074374 A1 | 4/2005 | Ogura |
| 2005/0207946 A1 | 9/2005 | Asano et al. |
| 2008/0264010 A1 | 10/2008 | Mizuno et al. |
| 2009/0202779 A1 * | 8/2009 | Yoshida ......................... 428/116 |
| 2009/0246453 A1 * | 10/2009 | Yamaguchi ................... 428/116 |
| 2010/0126133 A1 | 5/2010 | Fekety et al. |
| 2010/0135866 A1 | 6/2010 | Mizuno et al. |
| 2012/0107203 A1 | 5/2012 | Arnold et al. |

FOREIGN PATENT DOCUMENTS

| | | | | |
|---|---|---|---|---|
| JP | A-05-023512 | | 2/1993 |
| JP | A-09-077573 | | 3/1997 |
| JP | 2001-072479 A | | 3/2001 |
| JP | 2001072479 A | * | 3/2001 |
| JP | A-2001-137714 | | 5/2001 |
| JP | 2004-216226 A | | 8/2004 |
| JP | 2007-022822 A | | 2/2007 |
| JP | 2007-252997 A | | 10/2007 |
| JP | 2008-537510 A | | 9/2008 |
| JP | 2009-085010 A | | 4/2009 |
| JP | A-2009-106922 | | 5/2009 |
| JP | A-2009-183835 | | 8/2009 |
| JP | 2009-240878 A | | 10/2009 |
| JP | 2010-269268 A | | 12/2010 |
| JP | 2011-074275 A | | 4/2011 |
| WO | WO 02/26351 A1 | | 4/2002 |
| WO | WO 02/085482 A2 | | 10/2002 |
| WO | WO 2006/112052 A1 | | 10/2006 |
| WO | 20091133857 A1 | | 11/2009 |
| WO | WO 2010038245 A1 | * | 4/2010 | ............. C04B 37/00 |
| WO | 2010133565 A1 | | 11/2010 |
| WO | 20111040554 A1 | | 4/2011 |

OTHER PUBLICATIONS

European Search Report dated Dec. 5, 2013 corresponding to European Patent Application No. 10820676.4.
International Search Report for International Application No. PCT/JP2010/067134 (Jan. 25, 2011) with English translation.
Office Action mailed May 7, 2014, issued in corresponding Japanese Application No. 2011-534327 (with English translation).
International Search Report dated Jan. 18, 2011, issued in corresponding International Application No. PCT/JP2010/067138 (with English translation).
Office Action dated May 3, 2013, issued in corresponding U.S. Appl. No. 13/499,015.
Notice of Allowance dated Dec. 3, 2013, issued in corresponding JP Application No. 2011-534329 (with English translation).
European Search Report dated Mar. 14, 2014, issued in corresponding EP Application No. 10820678.0.

* cited by examiner

EXHAUST GAS PURIFYING FILTER

This application is a U.S. National Stage Application under 35 U.S.C. §371 of International Patent Application No. PCT/JP2010/067134, filed 30 Sep. 2010, which claims the benefit of priority to Japanese Patent Application No. 2009-228767 filed 30 Sep. 2009, the disclosures of all of which are hereby incorporated by reference in their entireties. The International Application was published in Japanese on 7 Apr. 2011 as WO 2011/040561.

TECHNICAL FIELD

The present invention relates to an exhaust gas purifying filter for eliminating particulate matter from exhaust gas which is exhausted from a diesel engine or the like of an automobile.

BACKGROUND

Various materials which are contained in exhaust gas which is exhausted from an engine of an automobile or the like, particularly a diesel engine are cause of air pollution, and have generated various environmental problems until now. Particularly, it is said that particulate matter (PM) which is contained in the exhaust gas is a cause of generation of allergic symptoms such as asthma or hay fever.

In general, in a diesel engine for an automobile, as an exhaust gas purifying filter for collecting particulate matter, a DPF (Diesel Particulate Filter) which has a sealing type ceramic honeycomb structure (filter substrate) is used. In the honeycomb structure, both ends of a cell (gas passage) of the ceramic honeycomb structure are sealed in a checker pattern, and particulate matter is collected when the exhaust gas passes through micropores in partitions between cells (for example, refer to PTLs 1 and 2)

CITATION LIST

Patent Literature

[PTL 1] JP-A-05-23512
[PTL 2] JP-A-09-77573

SUMMARY OF INVENTION

Technical Problem

However, since particulate matter is always exhausted from the engine when driving an automobile, the particulate matter is deposited in layers at the micropores and on the micropores of the partitions of the honeycomb structure. In this way, if the particulate matter is deposited in layers at the micropores and on the micropores of the partitions of the honeycomb structure, eventually the entire surfaces of the partitions are covered with the particulate matter, and the filter function is damaged.

In addition, since pressure loss increases due to the fact that the particulate matter is deposited in layers, a load in the driving of the automobile is generated. Thereby, it is necessary to regenerate the honeycomb structure by regularly removing the particulate matter through certain methods.

Therefore, in the related art, in order to eliminate the particulate matter, the temperature of the ceramic honeycomb structure increases by injecting fuel and increasing the temperature of the exhaust gas, and the honeycomb structure is regenerated by burning the deposited particulate matter. However, in this regeneration method, the honeycomb structure reaches a high temperature of 600° C. to 700° C. at the time of the burning, and increases to a higher temperature than this temperature at an earlier time. Thereby, strength in the partitions of the ceramic honeycomb structure cannot be maintained due to a thermal stress which is generated by the burning, and the honeycomb structure may be damaged. It is necessary to shorten the time in which the thermal stress is applied in order to prevent damage to the partitions, and for the sake of this, there is only a choice of shortening the burning time by decreasing the deposited amount of the particulate matter. Thereby, the frequency of the burning of the particulate matter and the regeneration cycle are increased and the fuel which is used for the burning is also increased, which adversely affects fuel consumption. In the present time, the efficiency of the ceramic honeycomb structure is not used at 100%.

The present invention is made with the consideration of the problems, and an object thereof is to provide an exhaust gas purifying filter capable of enhancing combustion efficiency at the time of the regeneration and preventing the filter substrate from being damaged.

Solution to Problem

The inventors have performed intensive studies to solve the above-described problems. As a result, the inventors found that an exhaust gas purifying filter obtains a high collection efficiency even in a state where the deposited amount of particulate matter decreases and suppresses an increase of a pressure loss by providing a porous film by having a predetermined average pore diameter and average porosity and having a specific composition and structure, on partitions of a honeycomb structure of a DPF; further shortens a combustion time of the particulate matter deposited on the partitions compared to the conventional exhaust gas purifying filter at a time of regenerating the DPF; and suppresses pore diameter distribution variation or deterioration of an oxidation catalyst component of the porous film and the exhaust gas purifying filter due to a high-temperature heat treatment at the time of regenerating the DPF, and as a result, suppresses variations of combustion characteristics of the particulate matter due to a high-temperature heat treatment, and the inventors have completed the present invention.

That is, an exhaust gas purifying filter of the present invention includes an inflow surface into which exhaust gas including particulate matter flows, an exhaust surface which exhausts purified gas, and a filter substrate which is constructed of a porous body, wherein the filter substrate includes porous partitions and gas passages which are enclosed by the partitions, and a porous film including silicon carbide, in which pores having a smaller pore diameter than the pores of the partitions are formed, is provided on the surface of the partitions, and a silicon dioxide layer is formed on at least an outer surface portion of the porous film.

It is preferable that the silicon dioxide layer be formed on an outer surface portion of the porous film and on a wall portion of the pores inside the porous film, the wall portion contacting gas.

It is preferable that the silicon dioxide layer be a layer which is formed by oxidizing a surface of the silicon carbide particles configuring the porous film.

It is preferable that the silicon dioxide layer be a layer which is formed from a silane compound which is coated, impregnated, or adsorbed on the porous film.

It is preferable that the porous film be obtained by sintering silicon carbide particles which include the silicon dioxide layer on the surface.

It is preferable that an average pore diameter of the porous film be more than 0.05 μm and 3 μm or less.

Advantageous Effects of Invention

The exhaust gas purifying filter of the present invention includes an inflow surface into which exhaust gas including particulate matter flows, an exhaust surface which exhausts purified gas, and a filter substrate which is constructed of a porous body, wherein the filter substrate includes porous partitions and gas passages which are enclosed by the partitions, a porous film including silicon carbide, in which pores having a smaller pore diameter than the pores of the partitions are formed, is provided on the surfaces of the partitions, and a silicon dioxide layer is formed on at least an outer surface portion of the porous film.

Thereby, it is possible to enhance combustion efficiency of the particulate matter at the time of regeneration. This is assumed because the particulate matter which is collected in a regeneration process of the exhaust gas purifying filter is easily decomposed by an effect of an oxidation point which is generated at the silicon dioxide layer of the porous film surface, and a holding environment in which thermal decrease is not generated at a contact surface between the particulate matter and the porous film.

In addition, in the exhaust gas purifying filter of the present invention, since the silicon carbide is present at places other than the surface of the porous film, the porous film having a high heat resistance and a high durability, in which the porous structure is not changed even by a temperature cycle, is provided.

In addition, in the exhaust gas purifying filter of the present invention, the collected particulate matter is collected on the surface of porous film without penetrating into the inner portions of the partitions of the filter substrate. Thereby, it is possible to prevent the partitions from being clogged. As a result, it is possible to suppress an increase of a pressure loss while maintaining collection efficiency of the particulate matter. Particularly, it is possible to suppress an increase ratio of the pressure loss according to deposition of the particulate matter at the time of use so as to be lower. Moreover, an interval of the regenerating cycle of the filter can be lengthened, and the regeneration frequency can be decreased. In addition, at the time of regeneration of the filter substrate, combustion gas uniformly contacts the particle matter on the porous film, a heat exchange between the porous film and the combustion gas passing through the porous film is effectively realized, and the particulate matter can be burned and eliminated in a short period of time. Therefore, fuel consumption of vehicle can be improved.

DETAILED DESCRIPTION (Exhaust Gas Purifying Filter)

A best mode of an exhaust gas purifying filter of the present invention will be described. Here, a DPF which is an exhaust gas purifying filter used in a diesel engine for an automobile will be described as the example.

Moreover, this mode is specifically described in order to better allow the gist of the invention to be understood, and does not limit the present invention except as otherwise noted.

The exhaust gas purifying filter of the present invention is an exhaust gas purifying filter including an inflow surface into which exhaust gas including particulate matter enters, an exhaust surface which exhausts purified gas, and a filter substrate which is configured of a porous body, wherein the filter substrate includes porous partitions and gas passages which are enclosed by the partitions, a porous film including silicon carbide, which has a smaller pore diameter than the pores of the partitions, is provided on the surfaces of the partitions, and a silicon dioxide layer is formed on at least an outer surface portion of the porous film.

Figure 1:
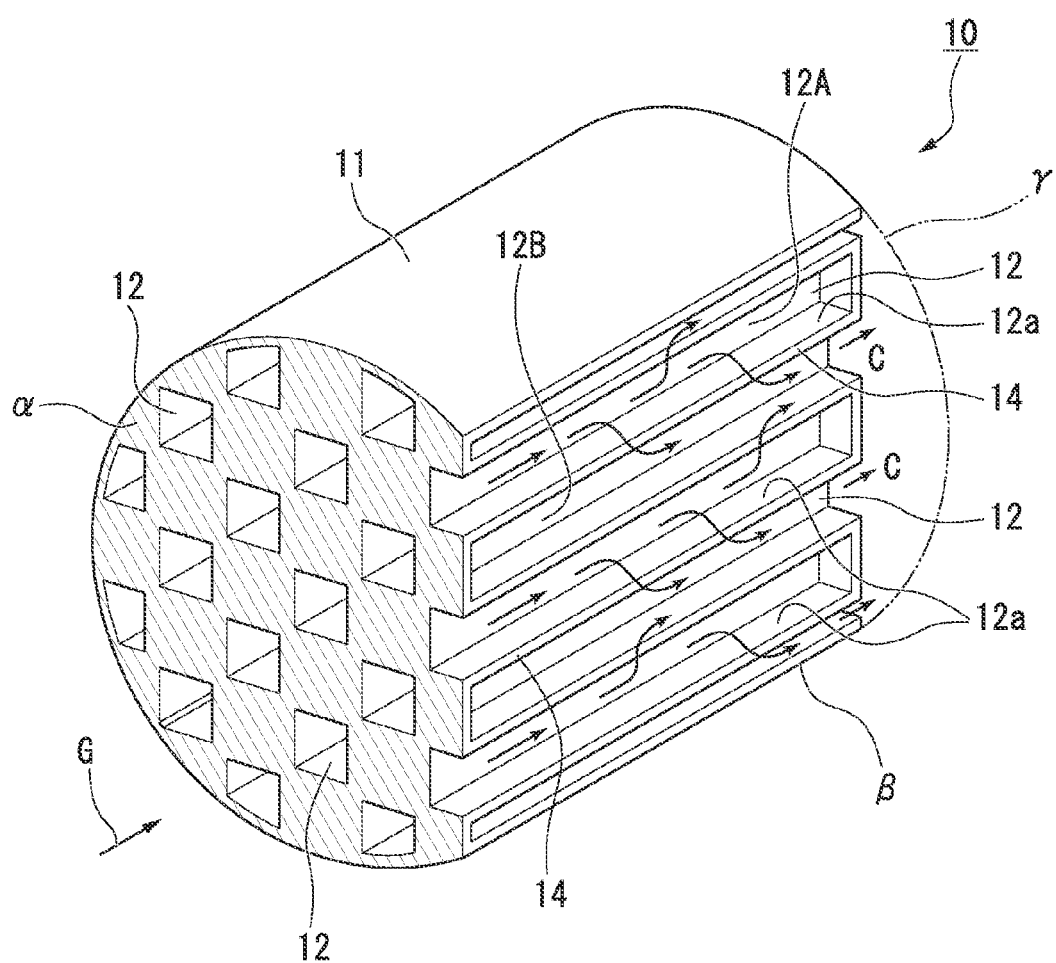
FIG. 1 is a partially cut away perspective view showing an exhaust gas purifying filter according to an embodiment.
Figure 2:
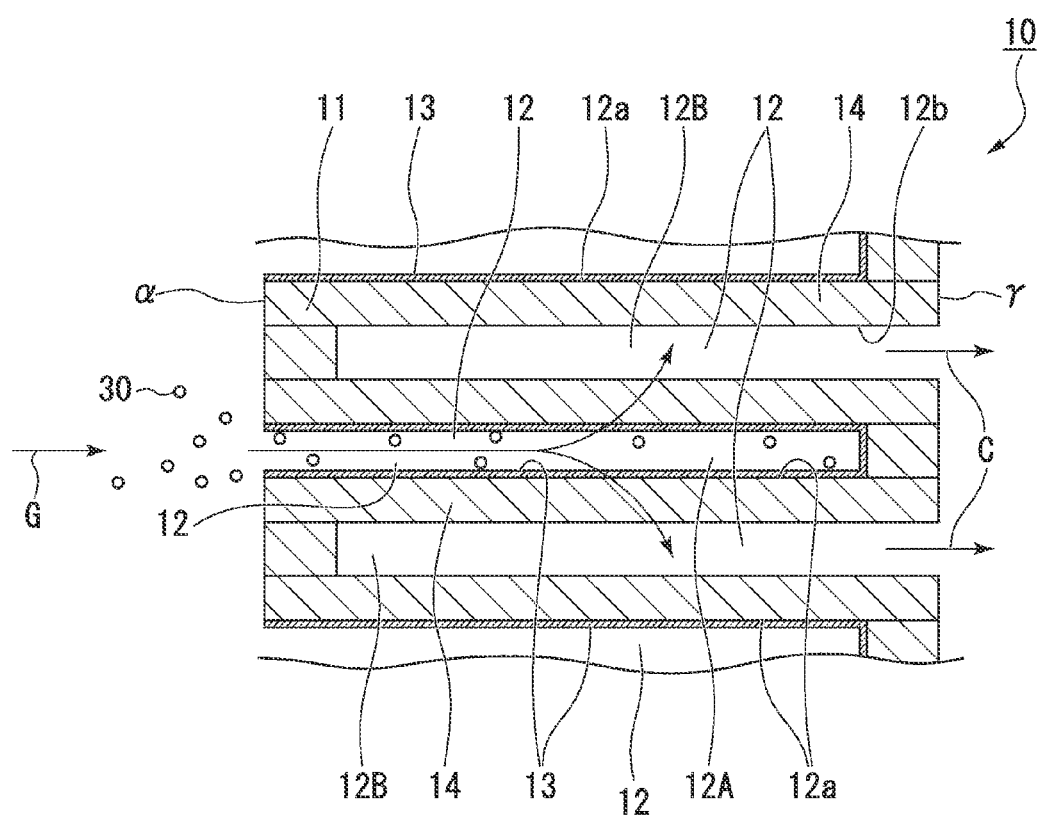
FIG. 2 is a cross-sectional view showing a partition structure of the exhaust gas purifying filter of the embodiment.

FIG. 1 is a partially broken perspective view showing a DPF which is an embodiment of the exhaust gas purifying filter of the present invention. FIG. 2 is a cross-sectional view showing a partition structure of the DPF in the aspect which is indicated by a reference numeral β in FIG. 1.

The DPF 10 includes a filter substrate 11 which is constructed of a cylindrical porous ceramic having a plurality of micropores (pores), gas passages 12 which are formed in the filter substrate, and a porous film 13 which is provided on an inner wall surface 12a of an inflow cells 12A in which an exhaust upstream side end is opened in the gas passages 12.

One end surface α of both end surfaces in an axial direction of the filter substrate 11 is an inflow surface into which an exhaust gas G including particulate matter flows, and the other end surface γ is an exhaust surface through which a purified gas C, in which the particulate matter is removed from the exhaust gas G, is exhausted.

The filter substrate 11 is a honeycomb structure which is configured of heat-resistant porous ceramic such as silicon carbide, cordierite, aluminum titanate, or silicon nitride. Partitions 14 which extend along the axial direction, which is the flow direction of the exhaust gas G, are formed in the filter substrate 11, and hollow regions in the axial direction which are enclosed by the partitions 14 form of a plurality of cellular gas passages 12.

Here, the "honeycomb structure" in the present embodiment uses a structure in which the plurality of gas passages 12 are formed so as to be parallel to one another in the filter substrate 11. The cross-sectional shape in a direction perpendicular to the axial direction of the gas passages 12 is a rectangular shape. However, the present invention is not limited thereto, and various cross-sectional shapes including a polygonal shape, a circular shape, an elliptical shape, or the like may be applied. In addition, a portion in the cross-sectional shape of the gas passage 12, which is formed in the vicinity of the outer circumference of the filter substrate 11, is formed of an arc shape. This is because the cross-section of the gas passage 12 is formed according to the outer shape of the filter substrate 11 in order to dispose the gas passages 12 up to the vicinity of the outer circumference of the filter substrate 11 without a gap.

It is preferable that the average pore diameter of the partitions 14 which are configured of a porous ceramic is 5 μm or more and 50 μm or less. If the average pore diameter is less than 5 μm, it is not preferable since pressure loss due to the partitions 14 themselves increases. On the contrary, if the average pore diameter is more than 50 μm, it is not preferable since strength of the partitions 14 is not sufficient or it is difficult to form the porous film 13 on the partitions 14.

The gas passage 12 is configured of a structure in which the upstream side end and the downstream side end are alternately occluded when viewed from the flow direction (longitudinal direction) of the exhaust gas G, that is, is configured of an inflow cell 12A in which the upstream side end (inflow surface) which is the inflow side of the exhaust gas G is opened and an outflow cell 12B in which the downstream side end (exhaust surface), which is a side exhausting the purified gas C, is opened. The porous film 13 which includes silicon carbide is formed on the inner wall surface 12a (surface of the partition 14 which configures the inflow cell 12A) of the inflow cell 12A.

Here, the porous film 13 including silicon carbide means that the porous film 13 is formed of particles which at least include the silicon carbide, or the porous film 13 is formed of a composite of the particles including the silicon carbide and particles having a component other than the silicon carbide. A ratio of the silicon carbide in the porous film 13 is preferably 50 volume % or more, and is more preferably 80 volume % or more.

As particles other than the silicon carbide which form the porous film 13, particles which are configured of an element of at least one kind selected from group 3 to 14 such as silicon (Si), aluminum (Al), zirconium (Zr), and titanium (Ti), or an oxide, a carbide, and a nitride thereof, may be solely used or may be contained so as to be complexed to the silicon carbide. In addition, particles which are configured of boron (B), and an oxide, a carbide, and a nitride thereof may be solely used or may be contained so as to be complexed to the silicon carbide.

That is, the particles which form the porous film 13 may be any one of (1) the particles which are configured of only the silicon carbide, (2) the particles of the silicon carbide complexed with the components other than the silicon carbide, for example, the element of at least one kind selected from group 3 to group 14 or an oxide, a carbide, and a nitride thereof (3) a composite of the particles which are configured of only the silicon carbide and the particles which are configured of the components other than the silicon carbide, for example, the element of at least one kind selected from group 3 to group 14 or an oxide, a carbide, and a nitride thereof, (4) a composite of the particles of the silicon carbide complexed with the components other than the silicon carbide, for example, the element of at least one kind selected from group 3 to group 14 or an oxide, a carbide, and a nitride thereof and the particles which is configured of the components other than the silicon carbide, for example, the element of at least one kind selected from group 3 to group 14 or an oxide, a carbide, and a nitride thereof.

In addition, the particles which are configured of the element of at least one kind from group 3 to group 14 such as silicon, aluminum, zirconium, and titanium, or an oxide, a carbide, and a nitride thereof may be contained as a sintering agent of the silicon carbide.

The porous film 13 is formed as an independent film on the inner wall surface 12a of the inflow cell 12A without penetrating too much into the micropore of the porous ceramic configuring the partition 14 of the filter substrate 11. That is, the particles including the silicon carbide which forms the porous film 13 are formed on the inner wall surface 12a of the inflow cell 12A in the state where the particles penetrate only the inlet portion of the pore which is formed in the partition 14. Moreover, the porous film 13 includes a plurality of pores and the pores communicate with one another. As a result, the porous film becomes a filter-like porous substance including penetrating holes.

Here, FIG. 2 shows the flow of the exhaust gas in the DPF 10. The exhaust gas G including particle matter 30 which flows from the inflow surface side, that is, from the end surface α side, flows into the DPF 10 from the inflow cell 12A which is opened to the inflow surface. Moreover, the exhaust gas passes through the partition 14 of the filter substrate 11 in a course of flowing from the end surface α side to the end surface γ side in the inflow cell 12A. At this time, the particulate matter 30 contained in the exhaust gas G is collected by the porous film 13 which is provided in the inner wall surface 12a of the inflow cell 12A and removed, and the purified gas C in which the particulate matter 30 is removed flows from the end surface α side to the end surface γ side in the outflow cell 12B and is exhausted from the opening end (end surface γ) of the outflow cell 12B to the outside of the filter.

Next, the porous film 13 which is formed on the partition 14 will be described in more detail.

In the present embodiment, the porous film 13 includes a silicon dioxide layer on a portion of at least the outer surface (the surface which faces the inside of the inflow cell 12A). According to this configuration, combustion efficiency of the particulate matter 30 can be improved when the particulate matter 30 which is collected in the porous film 13 is burned and the exhaust gas purifying filter 10 is regenerated. Although the reason is not entirely clear, in the regeneration process of the exhaust gas purifying filter 10, it is considered to be because the particulate matter 30 collected in the porous film 13 is easily burned and decomposed by action of an oxidation point which is generated at the silicon dioxide layer of the surface of the porous film 13 and the fact that the contact surface of the particulate matter and the porous film is maintained in an environment in which a thermal decrease is not generated. Moreover, in the present embodiment, nearly all particulate matter 30 is collected through a surface layer filtration, not a deep-bed filtration, by controlling the pore diameter as described hereinafter. Here, in the particulate matter 30 collected by the deep bed filtration, a rapid combustion (abnormal combustion) is easily generated from non-uniformity in the supply of the combustion gas or variation in the contact state with the porous film. However, in the present embodiment, since the particulate matter 30 collected by the deep bed filtration is not present, it is considered that the rapid combustion can be prevented. As a result, it is assumed that combustibility of the collected particulate matter can be improved without causing deterioration of thermal runaway.

Here, in the configuration in which "the silicon dioxide layer is provided in at least the outer surface portion of the porous film", the silicon dioxide layer may be provided on the surface of the silicon carbide particles which configure the surface portion of the porous film, and it is not necessary to provide the silicon dioxide layer in the inner portion of the porous film 13.

However, in the present embodiment, it is preferable that the silicon dioxide layer be formed in the portion in which the gas contacts the inner portion of the pore of the porous film 13 in addition to the outer surface portion of the porous film 13. In the configuration in which "the silicon dioxide layer is provided on the surface portion of the porous film and in the portion in which the gas contacts the pore of the inner portion", the silicon dioxide layer may be provided on the silicon carbide particles which configure the surface portion of the porous film, and the portion corresponding to the pore wall of the inner portion, that is, the silicon carbide particle surface of the portion which contacts the gas when the gas flows in the porous film. In this way, as the reason "why it is preferable that the silicon dioxide layer is formed on the portion which contacts the gas in the inner portion of the pore of the porous film", although with a small portion, it is considered to be because there is some possibility of the penetration of the particulate matter 30 to the inner portion of the porous film and there is an effect in the combustion and decomposition to incomplete combustion gas contained in the exhaust gas or the combustion gas.

Moreover, the silicon dioxide layer in the porous film 13 may be formed by a method in which the porous film is heated under an oxygen containing atmosphere after the silicon carbide particles are sintered and the porous film is formed or a method which performs a chemical treatment such as a thermal decomposition after coating, impregnating, and adsorbing a silane compound on the porous film. In addition, the porous film 13 may be formed by using the silicon carbide particles in which the silicon dioxide layer is formed on the surface in advance.

In the porous film 13, a thickness of the silicon dioxide layer is preferably 0.5 nm or more and 30 nm or less. More preferably, the thickness is a range between 1 nm or more and 10 nm less. If the thickness of the silicon dioxide layer is less than 0.5 nm, there is a concern that an effect of improving the combustion efficiency of the particulate matter 30 may not be obtained. If the thickness of the silicon dioxide layer is more than 30 nm, the obtained effect remains almost unchanged while much time is required to form the silicon dioxide layer.

A volume ratio of the silicon dioxide layer in the porous film 13 is preferably 2 volume % or more and 50 volume % or less. More preferably, the volume ratio is a range of 10 volume % or more and 40 volume % or less. If the volume of the silicon dioxide layer is less than 2 volume %, the silicon dioxide layer having the preferable film thickness of 0.5 nm or more and 30 nm or less cannot be formed under the condition that the particles configuring the porous film have a preferable average primary particle diameter of more than 0.05 μm and 3 μm or less, and there is a concern that that an effect of improving the combustion efficiency may not be obtained. On the other hand, if the ratio of the silicon dioxide layer is more than 50 volume %, there is a concern that the heat-resistance of the film structure in the porous film 13 may be significantly decreased.

The average pore diameter of the porous film 13 is preferably more than 0.05 μm and 3 μm or less. More preferably, the average pore diameter is 0.06 μm or more and 3 μm or less, and most preferably, the average pore diameter is 0.1 μm or more and 2.5 μm or less.

In this way, the average pore diameter of the porous film 13 is smaller than the pore diameter of the partition 14 (that is, the average pore diameter of the conventional DPF: about 5 to 50 μm). Thereby, the particulate matter 30 almost dose almost not penetrate into the partition 14 and is effectively collected by the porous film 13 from the step in which the deposited amount is smaller.

The reason why the average pore diameter of the porous film 13 is in the above-described range is the following. That is, if the average pore diameter is 0.05 μm or less, there is a concern that pressure loss may be increased when the exhaust gas including the particulate matter flows into the exhaust gas purifying filter 10. In addition, if the average pore diameter of the porous film 13 is more than 3 μm, there is a concern that improvement in the combustion efficiency of the particulate matter may not be achieved when the regeneration treatment of the exhaust gas purifying filter 10 is performed.

An average porosity of the porous film 13 is preferably 50% or more and 90% or less, and is more preferably 60% or more and 85% or less.

If the average porosity of the porous film 13 is less than 50%, since the average porosity of the porous film 13 is equal to or smaller than the porosity of the filter substrate 11, an increase in the pressure loss is generated, and there is a concern that the costs may be increased. On the other hand, if the average porosity of the porous film 13 is more than 90%, there is a concern that the structure or the strength of the porous film may be difficult to be maintained.

In addition, it is preferable that the thickness of the porous film 13 be 60 μm or less in a portion which is planarly overlapped with a hole portion which is included in the partition 14 in the inner wall surface 12a, and be 5 μm or more and 60 μm or less in a place which is planarly overlapped with a solid portion of the partition in the inner wall surface 12a. This will be described with reference to FIG. 3.

Figure 3:
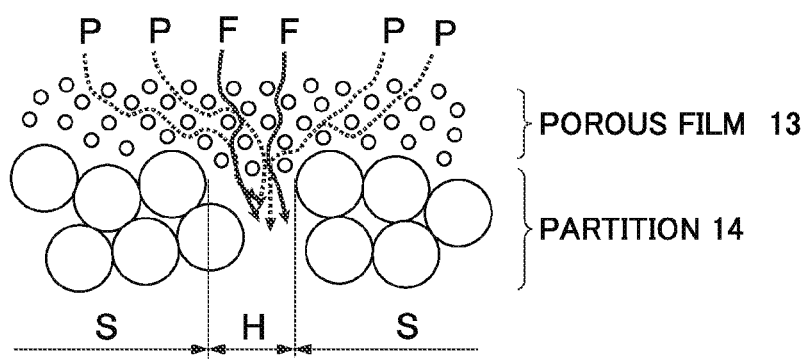
FIG. 3 is an enlarged view showing a cross-section of a partition structure according to a honeycomb structure type filter of an embodiment of the present invention.
Figure 3:
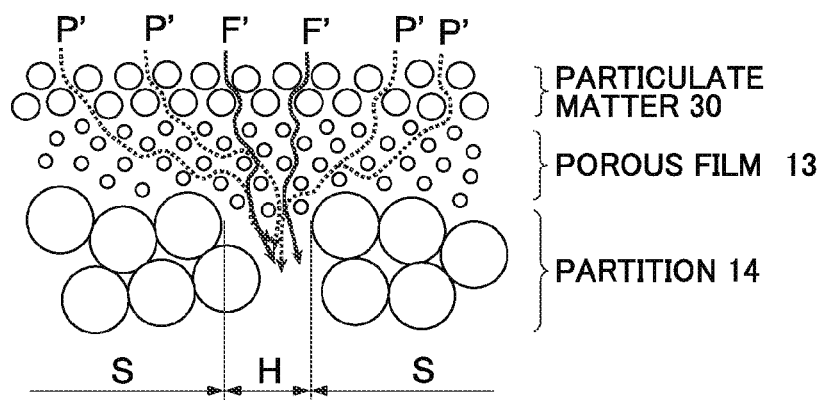
Figure 3:
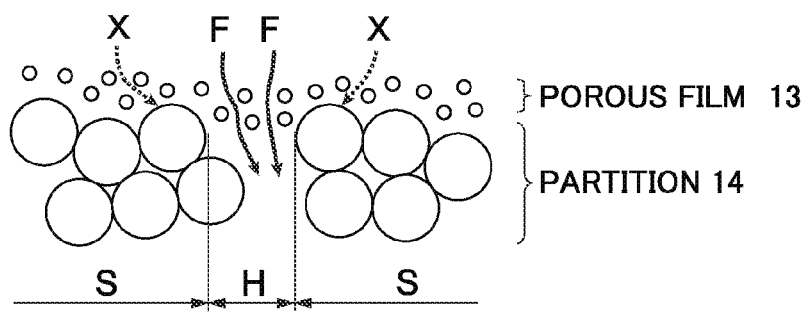
Figure 3:
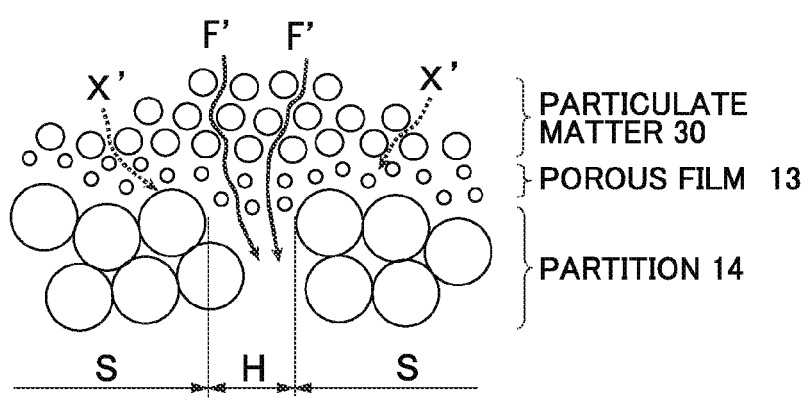

FIG. 3 is a view schematically showing the microstructure of the cross-section of the partition 14 and the porous film 13 which is provided on the partition 14, and also shows the flow (passage) of the exhaust gas and the combustion gas. Here, FIGS. 3(a) and 3(b) are in a state where the thickness of the porous film is within the range of the above-described embodiment, FIG. 3(a) shows a state before the particulate matter 30 is collected, and FIG. 3(b) shows a state where the particulate matter 30 is collected on the porous film 13 and is deposited. In addition, FIGS. 3(c) and 3(d) are in a state where the thickness of the porous film is less than 5 μm, FIG. 3(c) shows a state before the particulate matter 30 is collected, and FIG. 3(d) shows a state where the particulate matter 30 is collected on the porous film 13 and is deposited.

Here, the "hole portion" of the partition 14 indicates an opening which is provided due to the fact that the micropore which is formed by the porous body constructing the partition 14 is connected to the inner wall surface 12a, and corresponds to an H portion in FIG. 3. Here, the thickness of the porous film 13 at a portion located on a micropore (the portion in which the micropore overlaps with the porous film 13), wherein the micropore indicates a micropore exposed (opened) to the inner wall surface 12a, not a micropore of the inner portion of the partition 14, is discussed. Moreover, the "solid portion" indicates a portion in which the ceramic portion is directly exposed to the inner wall surface 12a in a portion excluding the hole portion among partitions which is a portion of the filter substrate 11, which is the porous ceramic, and corresponds an S portion in FIG. 3.

The thickness of the porous film 13 in the solid portion is preferably 5 μm or more and 20 μm or less, is more preferably 10 μm or more and 20 μm or less, and is most preferably 10 μm or more and 15 μm or less. In addition, the thickness of the porous film 13 in the hole portion is more preferably 35 μm or less.

The preferred thickness range is decided by the following reasons.

First, when the particulate matter 30 is collected in the exhaust gas purifying filter 10, the exhaust gas penetrates from the inflow cell 12A side to the hole portion of the partition 14, and passes through the outflow cell 12B side. Thereby, a passage of the exhaust gas which connects the outer surface of the porous film 13 and the hole portion of the partition 14, for example, F of FIG. 3(a) is formed on the portion in which the porous film 13 is overlapped with the hole portion of the partition 14.

Here, if the thickness of the porous film 13 is 5 µm or more, as shown in FIG. 3(a), a sufficient amount of the micropores for forming the passage which connects the outer surface of the porous film 13 and the hole portion of the partition 14 is present in the porous film 13 in the place in which the porous film 13 is overlapped with the solid portion of the partition 14. Therefore, the passage of the exhaust gas which connects the outer surface of the porous film 13 and the hole portion of the partition 14, for example, P in FIG. 3(a) is also formed in the place in which the porous film 13 is planarly overlapped with the solid portion of the partition 14. Due to the fact that the passage is formed, the pressure loss decreases, and the particulate matter 30 is uniformly collected on the porous film 13.

In addition, even in the case where the regeneration processing of the filter is performed by burning the particulate matter 30, since the passage of the combustion gas is similarly formed as indicated by F' and P' in FIG. 3(b), the combustion gas can uniformly flow in the particulate matter 30, and therefore, the combustion efficiency can be improved.

However, if the thickness of the porous film 13 is less than 5 µm, as shown in FIG. 3(c), the distance from the outer surface of the porous film 13 to the inner wall surface 12a becomes smaller, and the number of the micropores in the porous film 13 decreases. Therefore, in the place in which the porous film 13 is planarly overlapped with the solid portion of the partition 14, for example, like X in FIG. 3(c), it is difficult to form the passage of the exhaust gas which connects the outer surface of the porous film 13 and the hole portion of the partition 14, and there is a concern that the pressure loss may be increased. In addition, similarly, since the number of the micropores in the porous film 13 decreases, when the regeneration processing is performed by burning the particulate matter, there is a concern that the combustion efficiency of the particulate matter 30 may not be improved. Moreover, since the particulate matter 30 is collected only at, in the porous film 13, the portion which is overlapped with the hole portion and the collection becomes non-uniform, the collection efficiency is quickly decreased, and there is a concern that increase in frequency of the regeneration processing may be generated.

Moreover, similarly, since the number of the micropores in the porous film 13 is smaller, as shown in FIG. 3(d), when the regeneration processing is performed by burning the particulate matter 30, there is a concern that the combustion efficiency of the particulate matter 30 may not be improved.

In addition, if the thickness of the porous film 13 is more than 60 µm, when the exhaust gas including the particulate matter 30 flows into the exhaust gas purifying filter 10, the pressure loss increases due to providing the porous film 13. On the other hand, since the combustion efficiency of the particle matter 30 when there is almost no improvement of the regeneration processing compared to the case where the thickness of the porous film 13 is 60 µm or less, there is a concern that a decrease in the output of the engine on which the exhaust gas purifying filter 10 is mounted may be generated.

According to above-described reasons, the optimal range of the thickness of the porous film 13 is set.

It is preferable that the outer surface of the porous film 13 be formed in a substantially flat surface so as to be approximately parallel to the inner wall surface 12a. That is, although the inner wall surface 12a has a concave-convex pattern according to the shape of the particles which construct the partition 14, the surface profile of the inner wall surface 12a is not reflected at all in the outer surface of the porous film 13, and it is preferable that the outer surface be substantially flat surface. Moreover, a plane surface which represents the inner wall surface 12a is approximately assumed, and it is preferable that the plane surface and the outer surface of the porous film 13 are substantially parallel to each other. The state where the surface of the porous film and the plane surface which represents the inner surface 12a substantially becomes parallel is denoted as an "approximately parallel". For example, if the outer surface shape of the porous film 13 is the shape according to the inner wall surface 12a, the portion of the porous film 13, which is positioned on the hole portion of the partition 14, becomes a concave shape. In this case, the particulate matter 30 collected by the porous film 13 is easily accumulated in the concave portion, and as a result, since occlusion is formed at the position in which the porous film is overlapped with the hole portion through which the exhaust gas passes, the pressure loss is easily generated. In contrast, if the outer surface of the porous film 13 is formed so as to be approximately flat, the particulate matter 30 is collected on the entire surface of the porous film 13, localization of the collection is not generated, and therefore, the pressure loss is not easily generated.

In addition, the porous film 13 is preferably formed of silicon carbide particles having the average primary particle diameter of 0.01 µm or more and 5 µm or less, and is more preferably formed of silicon carbide particles having the average primary particle diameter of 1 µm or more and 4 µm or less.

The reason why it is preferable that the porous film 13 be formed of silicon carbide particles having the average primary particle diameter of 0.01 µm or more and 5 µm or less is the following. If the average primary particle diameter of the silicon carbide particles is less than 0.01 µm, there is a concern that the pressure loss may be increased when the exhaust gas including the particulate matter 30 flows into the exhaust gas purifying filter 10. In addition, if the average primary particle diameter of the silicon carbide particles is more than 5 µm, since a surface activity of the particles themselves are decreased or a specific surface area of the porous film decreases due to the increase of the pore diameter of the porous film, improvement in the combustion efficiency of the particulate matter cannot be achieved when the regeneration treatment of the exhaust gas purifying filter 10 is performed.

Moreover, this embodiment exemplifies the exhaust gas purifying filter 10 in which the porous film 13 is provided on the inner wall surface 12a of the inflow cell 12A. However, the porous film may also be provided on the inner wall surface of the outflow cell 12B (the surface of the partition 14 which configures the outflow cell 12B).

In addition, the porous film 13 may be configured so as to carry a decomposition-promoting catalyst which promotes the decomposition of the particulate matter 30 or a gaseous substance. The decomposition-promoting catalyst may be carried on the outer surface of the porous film 13 or may be carried on the pore wall surface of the inner portion. Alternatively, the decomposition-promoting catalyst may be formed in a film shape on either or both of the upper layer and the lower layer of the porous film 13. In addition, the porous film 13 may be formed by using particles the particles including the silicon carbide complexed with the particles including the decomposition-promoting catalyst.

As described above, the porous film 13 includes a silicon dioxide layer provided on at least the outer surface in the exhaust gas purifying filter 10 of the present embodiment. Therefore, it is possible to enhance the combustion efficiency of the particulate matter 30 at the time of the regeneration. Moreover, since the inner portion of the porous film 13 is silicon carbide, the porous film has a high heat-resistance, and the porous structure is not changed even through the temperature cycle and, thus, the porous film has a high durability.

Moreover, in the exhaust gas purifying filter 10, since the porous film 13, which includes silicon carbide and has the smaller pore diameter than the diameter of the pores of the partition 14, is provided on the surface of the porous partition 14 of the filter substrate 11, the increase in the pressure loss can be suppressed while the collection efficiency of the particulate matter 30 is maintained, particularly, it is possible to suppress the percentage of the increase in the pressure loss due to the deposition of the particulate matter when the filter is used. Therefore, a load to the vehicle can be decreased when driving the vehicle. In addition, since it is possible to suppress the percentage of the increase in the pressure loss due to the deposition of the particulate matter when the filter is used so as to be lower, a lot of particulate matter can be deposited on the exhaust gas purifying filter, and the interval of the regeneration cycle of the exhaust gas purifying filter can be lengthened.

(Method of Manufacturing Exhaust Gas Purifying Filter)

Next, a method of manufacturing the exhaust gas purifying filter of the present invention will be described.

The exhaust gas purifying filter of the present embodiment can be manufactured by an operation including: a step which coats a coating material for forming a porous film containing particles, which include at least silicon carbide, on the surface of the partition constructing the gas passage of the filter, that is, on the surface of the porous support having the micropores of 5 to 50 μm in average pore diameter; a step which forms the porous film on the surface of the porous support by heat treatment; and a step which forms a silicon dioxide layer on the surface of the porous film by heat treatment or chemical treatment (First Manufacturing Method).

Alternatively, the filter can be manufactured by an operation including: a step which coats a coating material for forming a porous film on the surface of the porous support (the partition) configuring the gas passage of the filter, wherein the coating material contains particles including at least silicon carbide and a silicon dioxide layer is provided on the particles; and a step which forms the porous film on the surface of the porous support by heat treatment (Second Manufacturing Method).

According to these methods, for example, compared to the method in which the gas dispersing particles flows into the filter substrate and the porous film is formed, or the like, the filter can be manufactured with improved productivity.

First, the first manufacturing method will be described. The coating material for forming the porous film which is used in the first manufacturing method of the present invention is particles including the silicon carbide and a dispersing liquid including a dispersion medium.

Here, the particles which includes the silicon carbide may be any one of particles formed from only a silicon carbide particle, particles which are formed from the composition of the silicon carbide complexed with components other than the silicon carbide, particles which mix the silicon carbide particles and the particles configured of the components other than silicon carbide, and particles which mix the particles, which are formed from the composition of the silicon carbide complexed with the components other than the silicon carbide, and the particles configured of the components other than the silicon carbide.

The particles which are obtained by a silica reduction method, an Acheson method, a thermal plasma method, a silica precursor calcinations method, or the like are used as the particles (silicon carbide particles) formed of only the silicon carbide. In addition, at least one kind of element which is selected from group 3 to group 14 such as silicon, aluminum, boron, zirconium, titanium, or the like, or an oxide, a carbide, and a nitride thereof can be selected as the components other than the silicon carbide.

The coating material for forming the porous film is prepared by dispersing the above-described particles including the silicon carbide into the dispersion medium.

It is preferable that the dispersion process uses a wet method. In addition, either of an opened disperser or a closed disperser can be used as the disperser which is used in the wet method, for example, a ball mill, an agitation mill, a jet mill, a vibrating mill, an attritor, a high-speed mil, a hammer mill, or the like are suitably used. As the ball mill, a rolling mill, a vibrating mill, a planetary mill, and the like are included, and, as the agitation mill, a tower mill, an agitation tank mill, a flow tube mill, a tubular mill, and the like are included.

Water or an organic solvent is suitably used as the dispersion medium. In addition, a polymer monomer, a simple substance of an oligomer, or the mixture thereof is used as needed.

As the organic solvent, for example, alcohols such as methanol, ethanol, 1-propanol, 2-propanol, diacetone alcohol, furfuryl alcohol, ethylene glycol, and hexylene glycol; esters such as acetic acid methyl ester and acetic acid ethyl ester; ether alcohols such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ethers such as dioxane and tetrahydrofuran; ketones such as acetone, methyl ethyl ketone, acetyl acetone, and acetoacetic acid esters; acid amides such as N,N-dimethylformamide; aromatic hydrocarbons such as toluene and xylene; or the like are suitably used, and only one kind of the solvents may be used, or two kinds or more solvents are mixed and used.

In addition, acrylic or methacrylic monomers such as methyl acrylate and methyl methacrylate, epoxy monomers, or the like are suitably used as the polymer monomer. Moreover, as the oligomer, urethane acrylate oligomer, epoxy acrylate oligomer, acrylate oligomer, or the like are suitably used.

Among dispersion media, water, alcohols, and ketones are preferably suitably used as the coating material. In addition, among those, the water and the alcohols are more preferable, and the water is most preferable.

In the coating material, a surface modification of the particles including the silicon carbide may be performed in order to enhance affinity between the particles and the dispersion medium. As the surface modification agent, 3-aminopropyl-trimethoxysilane, 3-aminopropyl triethoxysilane, cysteamine, tetramethylammonium hydroxide, aminoethanediol, or the like are included. However, the present invention is not limited thereto provided that surface modification agent includes a functional group adsorbed to the surface of the particles including the silicon carbide and an end group having affinity to the dispersion medium.

The coating material for forming the porous film may suitably contain a hydrophilic polymer, a hydrophobic polymer, or the like.

The polymer or the like can give functionalities such as a binder function, for example, between the particles which include the silicon carbide and the porous supports of the partition or the like of the exhaust gas purifying filter. The polymer or the like is dissolved in the dispersion medium and can be appropriately selected in the range in which the average secondary particle diameter of the particles in the coating material and the viscosity of the coating material become desired values.

Here, when water is used as the dispersion medium, as the hydrophilic polymer, for example, synthetic polymers such as polyvinyl alcohol, polyvinyl pyrrolidone, polyethylene glycol, polyacrylamide, polystyrene sulfonic acid, polyacrylic acid polyvinyl pyrrolidone, polyallylamine; natural polymers of polysaccharide and polysaccharide-derived substance, or the like such as cellulose, dextrin, dextran, starch, chitosan, pectin, agarose, carrageenan, chitin, mannan; and proteins and protein-derived substance such as gelatin, casein, collagen, laminin, fibronectin, elastin; or the like may be used.

In addition, materials such as gels and sols which are derived from the synthetic polymer, polysaccharides, proteins, or the like may be used as the hydrophilic polymer.

In addition, a ratio of the mass of the polymer with respect to the mass of the particles in the coating material (mass of polymer/mass of particles) can be appropriately selected in the range in which the average secondary particle diameter of the particles in the coating material and the viscosity of the coating material become desired values. However, the ratio is preferably a range of 0 or more and 1 or less, is more preferably 0 or more and 0.8 or less, and is most preferably 0 or more and 0.5 or less.

Since the polymer is the component which is finally destroyed by the heat treatment and does not remain in the porous film, if the ratio is more than 1, the percentage content of the polymer is increased too much, and an increase in the costs is generated, which is not preferable. In addition, since the hydrophilic polymer is not always necessarily used, the lower limit of the range becomes 0.

In order to secure a dispersion stability of the coating material or to improve the coating property, a surfactant, a preservative, a stabilizer, a deforming agent, a leveling agent, or the like may be appropriately added. These may be appropriately selected so that the average secondary particle diameter of the particles in the coating materials and the viscosity of the coating materials are within desired ranges.

The added amount of the surfactant, the preservative, the stabilizer, the deforming agent, the leveling agent, or the like is particularly not limited, and these may be added according to the purpose of the addition so that the viscosity of the coating material and the average secondary particle diameter of the particles in the coating material are within the ranges of the present invention.

In this way, the particles including the silicon carbide are dispersed in the dispersion medium, and the hydrophilic or hydrophobic polymer, the surfactant, the preservative, stabilizer, the deforming agent, the leveling agent, or the like are added if necessary and mixed, and become the coating material for forming the porous film.

Next, the coating material for forming the porous film is coated on the surface of the porous support, a coated film which may includes much liquid components such as solvent in addition to solid components such as the particles is formed, the obtained coated film is heat-treated after being dried, the silicon dioxide film is formed, and the porous film is formed.

For example, in the exhaust gas purifying filter 10, the coating material for forming the porous film is coated on the inner wall surface 12a (surface of partition 14 which configures inflow cell 12A) of the inflow cell 12A in which the exhaust upstream side end is opened, among gas passages 12, the coated film is formed, the obtained coated film is heat-treated, the silicon dioxide film is formed on at least the outer surface of the porous film by a heat treatment or a chemical treatment, and the porous film 13 is formed.

The coating method may be appropriately selected according to the shape or the material of the porous support, and is not particularly limited. That is, general wet coat methods of awash coat, a dip coat, or the like may be used. In addition, after the coating, a step in which the extra coating liquid which is more than the amount needed for obtaining a desired film thickness is eliminated by using compressed air and the like may be performed.

Moreover, at the time of the coating, the coating may be performed in a state where the porous support is dried. However, a state where the porous support is immersed in the solvent in advance and air in the pores of the porous support is replaced by the solvent in advance is preferable. The reason is the following. That is, the air which remains in the pores of the porous support becomes bubbles from the porous support during or after the coating step and is discharged. Therefore, the state in which the porous film is partially not formed is suppressed, and an effect which can obtain the uniform porous film is achieved.

In this way, since a lot of solvent is included in the coated film or the porous support, it is preferable that drying be performed before performing the heat treatment. Since the drying conditions are different according to the kind or the used amount of the solvent, the drying conditions cannot be categorically defined. For example, in the case of water, the condition, in which the drying is performed over about 15 minutes or more and about 10 hours or less at 50° C. or more and 200° C. or less, is preferable.

Moreover, the drying step may be performed along with a heat treatment step described below. For example, the heat treatment step may be performed by increasing the temperature in the state after the drying step ends. Moreover, the temperature-increasing step of the heat treatment step doubles as the drying step by adjusting the temperature-increasing condition in the heat treatment step, and the drying step can be substantially omitted.

Since the polymer, the surfactant, the preservative, the stabilizer, the deforming agent, leveling agent, and the like are added to the coated film if necessary in addition to the dispersing agent, a heat treatment, which removes the organic component, sinters the particles including the silicon carbide in the coated film, forms the porous structure, and the like, is performed.

The heat treatment temperature is preferably 900° C. or more and 2000° C. or less, and more is preferably 1000° C. or more and 1800° C. or less.

In addition, the heat treatment time is preferably 0.5 hours or more and 10 hours or less, and is more preferably 1 hour or more and 4 hours or less.

The atmosphere at the time of the heat treatment may be either of an inert atmosphere such as nitrogen, argon, neon, and xenon, and a reducing atmosphere such as hydrogen and carbon monoxide. When the heat treatment is performed at the inert atmosphere or the reducing atmosphere, there is no concern that the surface of the particles which include the silicon carbide or the outer surface of the porous film which is formed by the heat treatment may be oxidized and a silicon dioxide film may be generated. Therefore, the silicon dioxide film in which the film thickness is controlled can be obtained by a next step which "forms the silicon dioxide layer on the surface of the porous film".

In addition, the heat treatment can be performed in an oxidizing atmosphere such as the atmosphere. In this case, since the content of the heat treatment step is the same as the content of the next step, it is necessary to simultaneously control the heat treatment (sintering) conditions for forming the porous structure and the conditions for forming the silicon dioxide layer, and a strictness in the conditions of the heat treatment, a high precision in the control, and the like are required. Therefore, if the two sets of conditions are simultaneously satisfied, a foreshortening of the step can be performed, which is preferable. Otherwise, it is preferable to perform the heat treatment (sinter) step for forming the porous structure under an inert atmosphere or a reducing atmosphere and the step which forms the silicon dioxide layer on the surface of the porous film under an oxidizing atmosphere, independently.

Moreover, in the manufacturing method of the present embodiment, a silicon dioxide layer is formed on at least the outer surface of the porous film, that is, the outer surface of the porous film and, if necessary, the surface of the portion which contacts the gas of the inner portion of the pores of the porous film by heat-treating the porous film obtained by the heat treatment under an oxidizing atmosphere such as the atmosphere or conducting a chemical treatment due to a thermal decomposition or the like of a silane compound. A preferable film thickness of the silicon dioxide layer is 0.5 nm or more and 30 nm or less.

The heat treatment temperature in the case where the heat treatment is performed under the oxidizing atmosphere for forming the silicon dioxide layer may be equal to or higher than the temperature in which the surface of the particles which includes the silicon carbide forming the porous film is oxidized. However, since it is difficult to obtain a suitable film thickness due to the fact that the oxidizing speed is increased too much in a case of a high temperature, it is preferable that the heat treatment temperature be 600° C. or more and 1000° C. or less. In addition, the heat treatment time is dependent on the heat treatment temperature or the required thickness of the silicon dioxide layer and is preferably 0.5 hours or more and 20 hours or less. The reason is because the controllability of the film thickness is not changed compared with the case of 20 hours or less, even if the heat treatment time is more than 20 hours, while the control of the film thickness is difficult if the heat treatment time is less than 0.5 hours. As described above, the atmosphere at the time of the heat treatment is the atmosphere or the oxidizing atmosphere such as oxygen.

Moreover, in the case where the chemical treatment such as the thermal decomposition of the silane compound is used in order to form the silicon dioxide layer, the silence compound is adhered onto the outer surface of the porous film or the surface of the portion which contacts the gas in the inner portion of the pores, the porous film is heat-treated, the adhered silane compound is thermally decomposed, and therefore, the silicon dioxide layer can be formed. As the adhering method of the silane compound, a method in which a liquid silane compound or the silane compound liquid which is dissolved in the solvent is coated on the porous film, or a method in which the porous film is immersed in the liquid silane compound or a silane compound solution can be used. In addition, vapor of the silane compound may be adsorbed by exposing vapor of the silane compound having high volatility such as hexamethyldisilazane (HMDS) on the porous film. As the silane compound, there are tetramethoxysilane, tetraethoxysilane, methylsilane, dimethylsilane, trimethylsilane, diethyl silane, propyl silane, and phenylsilane, in addition to the hexamethyldisilazane, and the derivative substitution or the partial hydrolysate thereof, and the like.

The method which forms the silicon dioxide layer by decomposing the adhered silane compound is not particularly limited if not deteriorating the porous film which is obtained from the previous step, and the method which thermally decomposes the silane compound by the heat treatment can be appropriately used. The heat treatment condition is dependent on the kind or the adhered amount of the silane compound. However, in general, the condition is 500° C. or more and 1000° C. or less, and 0.5 hours or more and 20 hours or less, and it is preferable that the heat treatment be performed under the oxidizing atmosphere.

In this way, the silicon dioxide layer is formed on at least the outer surface of the porous film which is configured of the particles including the silicon carbide, and the porous film 13 of the present embodiment can be obtained.

In addition, the thickness of the required silicon dioxide layer tends to increase as the particle diameter of the particles which includes the silicon carbide increases. This is assumed because the activity of the particles which themselves included decreases as the particle diameter increases. This is similar to the case of the second manufacturing method.

In the first manufacturing method of the present embodiment, first, the particles including the silicon carbide are partially sintered through the heat-treatment in the reducing atmosphere or the inert atmosphere, the porous film is formed by forming a three-dimensional structure having the pores, and the porous film having the stable three-dimensional structure is obtained. Thereafter, by performing the heat treatment on the porous film in the oxidizing atmosphere and by the thermal decomposition of the silane compound adhered to the porous film, the silicon dioxide layer can be formed on at least the outer surface portion of the porous film without destroying the three-dimensional structure. More specifically, for example, after a monolith structure in which the silicon carbide particles are partially sintered is formed by performing the heat treatment on the coated film configured of the silicon carbide particles at 1200° C.×2 hours under an argon atmosphere, the silicon dioxide layer having the thickness of 1 nm can be formed on the surface of the silicon carbide particles configuring the porous film by performing the heat treatment on the monolith structure at 800° C.×4 hours under the atmosphere.

In addition, for example, after the monolith structure in which the silicon carbide particles are partially sintered is formed by performing the heat treatment on the coated film configured of the silicon carbide particles at 1200° C.×2 hours under the argon atmosphere, the silicon dioxide layer having the thickness of 2 nm can be formed on the surface of the silicon carbide particles configuring the porous film by coating a partial hydrolysate of tetramethylsilane on the monolith structure and performing the heat treatment on the monolith structure at 600° C.×10 hours under the atmosphere.

Next, a second manufacturing method will be described.

The coating material for forming the porous film which is used in the second manufacturing method of the present invention includes particles which include a silicon carbide and has a silicon dioxide layer on the surface and a dispersing liquid including a dispersion medium.

Here, the particles which include the silicon carbide and have the silicon dioxide layer on the surface may be any one of particles formed from only a silicon carbide particle, particles formed from the composition of the silicon carbide complexed with components other than the silicon carbide, particles which mix the silicon carbide particles and the particles having the components other than silicon carbide, and particles which mix the particles formed from the composition of the silicon carbide complexed with the components other than the silicon carbide, and the particles having the components other than silicon carbide, in which the silicon dioxide layer is formed on the surface of the particles (the particles which are formed from only the silicon carbide particle or the composite of the silicon carbide complexed with the components other than the silicon carbide) which include the silicon carbide as the component in the particles. The thickness of the silicon dioxide layer is preferably 0.5 nm or more and 30 nm or less, and is more preferably 1 nm or more and 10 nm or less. The volume ratio of the silicon dioxide layer with respect to the entire particles is preferably 2 volume % or more and 50 volume % or less, and is more preferably a range of 10 volume % or more and 40 volume % or less. If the volume ratio deviates from the ranges, in the porous film 13 which is formed by using the particles which includes the silicon carbide and has the silicon dioxide layer in the surface, there is a concern that the thickness of the silicon dioxide layer or the volume ratio of the silicon dioxide layer may be not within the predetermined range.

Similar to the first manufacturing method, the particles which are obtained from a silica reduction method, an Acheson method, a thermal plasma method, a silica precursor calcinations method, or the like is used as the particles (silicon carbide particles) formed from only the silicon carbide. In addition, at least one kind of element which is selected from group 3 to group 14 such as silicon, aluminum, boron, zirconium, titanium, or the like, or an oxide, a carbide, and a nitride thereof can be selected as the components other than the silicon carbide. Moreover, in the second manufacturing method, since the silicon dioxide layer which is formed on the surface of the particles in advance has the effect such as the sintering agent, the components other than the silicon carbide do not necessarily need to be added.

Although not particularly limited as the method which forms the silicon dioxide layer on the surface of the particles including the silicon carbide as the component, the method which performs the heat treatment in the oxidizing atmosphere such as the atmosphere can be appropriately used. It is preferable that the heat treatment temperature be 600° C. or more and 1000° C. or less and the heat treatment time be 0.5 hours or more and 20 hours or less.

In addition, the silane compound is adhered onto the surface of the particles which includes the silicon carbide as the component in advance, and the silicon dioxide layer may be formed from the silane compound by the chemical treatment such as the thermal decomposition.

The coating material for forming the porous film is prepared by dispersing the above-described particles including the silicon carbide in the dispersion medium. Since the formation method of the coating material is similar to the first manufacturing method, the description is omitted.

Next, the coating material for forming the porous film is coated on the surface of the porous support, a coated film which includes more liquid components such as solvent in addition to solid components such as the particles is formed, the obtained and coated film is heat-treated after being dried, and the porous film is formed.

For example, in the exhaust gas purifying filter 10, the coating material for forming the porous film is coated on the inner wall surface 12a (surface of partition 14 which configures inflow cell 12A) of the inflow cell 12A in which the exhaust upstream side end is opened, among gas passages 12, the coated film is formed, the obtained and coated film is heat-treated, and the porous film 13 is formed.

Here, since the formation method and the drying method of the coated film are similar to the first manufacturing method, the detailed description is omitted.

Moreover, since the silicon dioxide layer is formed on the surface of the particles in advance, the heat treatment method is performed not in the oxidizing atmosphere but in the inert atmosphere or the reducing atmosphere. Except for this point, since the second manufacturing method is similar to the first manufacturing method, the detailed description is omitted.

In the second manufacturing method of the present embodiment, first, the particles which include at least silicon carbide and have the silicon dioxide layer on the surface are obtained by performing the heat treatment on the particles including at least the silicon carbide in the oxidizing atmosphere or by performing the thermal decomposition of the silane compound which is adhered onto the surface of the particles. Moreover, by performing the heat-treatment on the obtained particles in the reducing atmosphere or the inert atmosphere, the particles which include the silicon carbide and have the silicon dioxide layer on the surface are partially sintered to forming a stable three-dimensional structure with porous and, as a result, the porous film which has the silicon dioxide layer on at least the outer surface portion of the porous film and is configured of a stable three-dimensional structure can be formed.

More specifically, for example, there is a method which performs the heat treatment on the surface of the silicon carbide particles at 800° C. and over 2 hours under the atmosphere in advance, and forms the porous film by using the silicon carbide particles which form the silicon dioxide layer on the surface.

In the second manufacturing method, the processing which forms the silicon dioxide layer on the surface of the porous film is not needed in the manufacturing step of the exhaust gas purifying filter, and the manufacturing efficiency can be enhanced.

EXAMPLE

Hereinafter, the present invention is specifically described according to Examples and Comparative Examples. However, the present invention is not limited to the Examples.

First, the samples of the exhaust gas purifying filters of Examples 1 to 7 and Comparative Example 1 and 2 were manufactured. Thereafter, evaluation of each sample was performed by using an evaluation method described below.

(Evaluation of Physical Properties of Exhaust Gas Purifying Filter)

In the each sample of the manufactured exhaust gas purifying filter, measurement of the thickness of the porous film and the silicon dioxide layer, measurement of the average pore diameter and the porosity of the porous film, a pressure loss test, and a combustion test were performed according to the following method.

(1) Measurement of Thickness of Porous Film and Silicon Dioxide Layer

The thickness of the porous film was measured by breaking the partition of the exhaust gas purifying filter and observing the cross-section of the partition through a field emission-type scanning electron microscope (FE-SEM)S-4000 (made by Hitachi Instruments Service Co.).

Specifically, with a magnification of 400 times, the value obtained by averaging the thicknesses measured at ten points which divide 1 mm in the length of the cross-section of the film into 0.1 mm intervals in each of the particle surface (solid portion) and the micropore portion (hole portion) of the ceramic honeycomb structure became the thickness of each porous film.

In addition, the prepared porous film was cut along with the substrate, and the thickness of the silicon dioxide layer was measured by performing a composition analysis of the surface of the porous film through an ESCA (Electron Spectroscopy for Chemical Analysis).

(2) Measurement of Average Pore Diameter and Porosity of Porous Film

The average pore diameter and porosity of the porous film formed on the partition surface of the exhaust gas purifying filter was measured by using a mercury porosimeter (Pore Master 60GT made by Quantachrome Co.). 50% accumulation of the mercury intruding volume to the film portion became the average pore diameter of the porous film of the exhaust gas purifying filter.

(3) Pressure Loss Test

Dried air having a flow rate of 100 L/min flowed from the inflow opening side of the exhaust gas purifying filter, the dried air passed through the partition of the exhaust gas purifying filter and was discharged from the discharge opening side, and the pressure loss for the inflow opening side was measured at this time.

The prepared exhaust gas purifying filter was mounted on a diesel engine having an air volume displacement of 2.2 L and driven at an engine speed of 1500 rpm, the PM (particulate matter included in the exhaust gas) of 3 g/L was deposited in the exhaust gas purifying filter, and it was determined to be good if (the pressure loss of the exhaust gas purifying filter in which the PM of 3 g/L was deposited)/(the pressure loss of the initial (before the deposition) exhaust gas purifying filter substrate) 4.0.

(4) Combustion Test

Each exhaust gas purifying filter was mounted on a diesel engine having an air volume displacement of 2.2 L and driven at an engine speed of 1500 rpm, and the particulate matter was deposited in the exhaust gas purifying filter.

After heating the exhaust gas purifying filter in which the particulate matter was deposited up to 600° C. in the nitrogen atmosphere, the particulate matter was burned by introducing the mixed gas consisting of 3.8% of oxygen, 200 ppm of nitric monoxide (NO), and nitrogen as the remainder at the flow rate of 13.5 liters/minute while maintaining the temperature. The time from when the oxygen was introduced to when the particulate matter was destroyed by burning and the mass of the particulate matter became 10% of the deposited amount was measured, and became the index of the particulate matter combustibility.

Moreover, in the combustion processing, an amount of the carbon dioxide and the carbon monoxide was measured by using a MEXA-7500D made by HORIBA. The total amount of the carbon included in the detected carbon dioxide and the carbon monoxide corresponded to the entire deposited amount of the particulate matter, and from the accumulated amount of the carbon dioxide, the time until the remaining amount of the particulate matter became 10% of the entire deposited amount was calculated.

EXAMPLE 1

100 parts by mass of silicon carbide powder having an average particle diameter of 0.03 μm and 2 parts by mass of alumina powder which is the sintering agent having the average particulate diameter of 0.2 μm were mixed, and the ceramic powder (SiC—$Al_2O_3$) consisting of the silicon carbide powder and the alumina powder was obtained.

Next, first, the ceramic powder was put into pure water so that the amount of the ceramic powder was 12 volume %, the amount of water was 87 volume %, and the amount of a gelling agent was 1 volume %, the ceramic power and the pure water were put into an agitator and mixed over 12 hours at the rotational speed of 60 rpm in a ball mill, and slurry was obtained.

Thereafter, gelatin was added to the slurry as the gelling agent, and these were mixed over 15 minutes, and the coating material for forming the porous film according to Example 1 was obtained.

Next, after the ceramic honeycomb structure (filter substrate (honeycomb filter formed of silicon carbide: DPF, average pore diameter is 12 μm and average porosity is 45% in partition)) was immersed into the coating material for forming the porous film, the honeycomb structure was lifted up and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 1000° C. at a rate of increase of 15° C. per minute, the ceramic honeycomb structure was maintained at 1000° C. for 1 hour and sintered, and the porous film configured by sintering the ceramic powder was formed on the surface of the ceramic honeycomb structure.

Thereafter, the surface of the porous film was oxidized through the heat treatment which was performed at 800° C. over 8 hours under the atmosphere, and the exhaust gas purifying filter having the porous film which included the silicon dioxide layer on the surface was manufactured.

In the manufactured exhaust gas purifying filter, the average pore diameter of the porous film became 0.08 μm. In addition, the average thickness (thickness on the solid portion in which the micropores are not present) of the formed porous film up to the particle surface of the ceramic honeycomb structure was 10 μm, and the average thickness (thickness on the hole portion in which micropores are opened to the surface) up to the micropore portion was 18 μm. The silicon dioxide layer having the thickness of 2.0 nm was formed on the outermost surface of the porous film. The average porosity of the porous film was 85%.

EXAMPLE 2

Silicon carbide powder having an average particle diameter of 0.9 μm were used as the ceramic powder (SiC) which was the configuration material of the porous film, first, the ceramic powder was put into pure water so that the amount of the ceramic powder was 6 volume %, the amount of water was 91 volume %, and the amount of a gelling agent was 3 volume %, the ceramic power and the pure water were put into an agitator and mixed over 12 hours at the rotational speed of 60 rpm in a ball mill, and slurry was obtained.

Thereafter, gelatin was added to the slurry as the gelling agent, and these were mixed over 15 minutes, and the coating material for forming the porous film according to Example 2 was obtained.

Next, after the ceramic honeycomb structure (honeycomb filter formed of silicon carbide: DPF, average pore diameter is 12 μm and average porosity is 45% in partition) was immersed into the coating material for forming the porous film, the honeycomb structure was lifted up, and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 1800° C. at a speed of 15° C. per minute, the ceramic honeycomb structure was maintained at 1800° C. for 2 hour and sintered, and the porous film configured by sintering the ceramic powder was formed on the surface of the ceramic honeycomb structure.

Thereafter, the surface of the porous film was oxidized through the heat treatment which was performed at 900° C. over 6 hours under the atmosphere, and the exhaust gas purifying filter having the porous film which included the silicon dioxide layer on the surface was manufactured.

In the manufactured exhaust gas purifying filter, the average pore diameter of the porous film became 1.1 μm. In addition, in the formed porous film, the average thickness on the solid portion of the ceramic honeycomb structure was 11

μm, and the average thickness on the hole portion was 20 μm. The silicon dioxide layer having the thickness of 1.5 nm was formed on the outermost surface of the porous film. The average porosity of the porous film was 81%.

EXAMPLE 3

100 parts by mass of silicon carbide powder having the average particle diameter of 1.2 μm and 2 parts by mass of yttria powder which is a sintering agent having an average particulate diameter of 0.1 μm were mixed, and a ceramic powder (SiC-$Y_2O_3$) consisting of the silicon carbide powder and the yttria powder was obtained.

Next, first, the ceramic powder was put into pure water so that the amount of the ceramic powder was 6.5 volume %, the amount of water was 92.5 volume %, and the amount of a gelling agent was 1 volume %, the ceramic power and the pure water were put into an agitator and mixed over 3 hours at the rotational speed of 60 rpm in a ball mill, and slurry was obtained.

Thereafter, gelatin was added to the slurry as the gelling agent, and these were mixed over 15 minutes, and the coating material for forming the porous film according to Example 3 was obtained.

Next, after the ceramic honeycomb structure (honeycomb filter formed of silicon carbide: DPF, average pore diameter is 12 μm and average porosity is 45% in partition) was immersed into the coating material for forming the porous film, the honeycomb structure was lifted up and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 1700° C. w at a speed of 15° C. per minute, the ceramic honeycomb structure was maintained at 1700° C. for 2 hours and sintered, and the porous film configured by sintering the ceramic powder was formed on the surface of the ceramic honeycomb structure.

Thereafter, the surface of the porous film was oxidized through the heat treatment which was performed at 850° C. over 10 hours under the atmosphere, and the exhaust gas purifying filter having the porous film which included the silicon dioxide layer on the surface was manufactured.

In the manufactured exhaust gas purifying filter, the average pore diameter of the porous film became 1.6 μm. In addition, in the formed porous film, the average thickness on the solid portion of the ceramic honeycomb structure was 10 μm, and the average thickness on the hole portion was 15 μm. The silicon dioxide layer having the thickness of 2.0 nm was formed on the outermost surface of the porous film. The average porosity of the porous film was 76%.

EXAMPLE 4

100 parts by mass of silicon carbide powder having an average particle diameter of 2.0 μm and 2 parts by mass of yttria powder which is the sintering agent having the average particulate diameter of 0.1 μm were mixed, and the ceramic powder (SiC-$Y_2O_3$) consisting of the silicon carbide powder and the yttria powder was obtained.

Next, first, the ceramic powder was put into pure water so that the amount of the ceramic powder was 8 volume %, the amount of water was 90 volume %, and the amount of a gelling agent was 2 volume %, the ceramic power and the pure water were put into an agitator and mixed over 3 hours at the rotational speed of 60 rpm in a ball mill, and slurry was obtained.

Thereafter, gelatin was added to the slurry as the gelling agent, and these were mixed over 15 minutes, and the coating material for forming the porous film according to Example 4 was obtained.

Next, after the ceramic honeycomb structure (honeycomb filter formed of silicon carbide: DPF, average pore diameter is 12 μm and average porosity is 45% in partition) was immersed into the coating material for forming the porous film, the honeycomb structure was lifted up and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 1700° C. at a speed of 15° C. per minute, the ceramic honeycomb structure was maintained at 1700° C. for 2 hour and sintered, and the porous film configured by sintering the ceramic powder was formed on the surface of the ceramic honeycomb structure.

Thereafter, the surface of the porous film was oxidized through the heat treatment which was performed at 800° C. over 8 hours under the atmosphere, and the exhaust gas purifying filter having the porous film which included the silicon dioxide layer on the surface was manufactured.

In the manufactured exhaust gas purifying filter, the average pore diameter of the porous film became 2.0 μm. In addition, in the formed porous film, the average thickness on the solid portion of the ceramic honeycomb structure was 21 μm, and the average thickness on the hole portion was 35 μm. The silicon dioxide layer having the thickness of 0.6 nm was formed on the outermost surface of the porous film. The average porosity of the porous film was 63%.

EXAMPLE 5

100 parts by mass of silicon carbide powder having an average particle diameter of 5.0 μm and 1 part by mass of boron carbide powder which is the sintering agent having an average particulate diameter of 0.8 μm were mixed, and the ceramic powder (SiC—$B_4C$) consisting of the silicon carbide powder and the boron carbide powder was obtained.

Next, first, the ceramic powder was put into pure water so that the amount of the ceramic powder was 12 volume %, the amount of water was 87 volume %, and the amount of a gelling agent was 1 volume %, the ceramic power and the pure water were put into an agitator and mixed over 6 hours at the rotational speed of 60 rpm in a ball mill, and slurry was obtained.

Thereafter, gelatin was added to the slurry as the gelling agent, and these were mixed over 15 minutes, and the coating material for forming the porous film according to Example 5 was obtained.

Next, after the ceramic honeycomb structure (honeycomb filter formed of silicon carbide: DPF, average pore diameter is 12 μm and average porosity is 45% in partition) was immersed into the coating material for forming the porous film, the honeycomb structure was lifted up and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 2000° C. at a speed of 15° C. per minute, the ceramic honeycomb structure was maintained at 2000° C. for 2 hours and sintered, and the porous film configured by sintering the ceramic powder was formed on the surface of the ceramic honeycomb structure.

Thereafter, the surface of the porous film was oxidized through the heat treatment which was performed at 850° C.

over 15 hours under the atmosphere, and the exhaust gas purifying filter having the porous film which included the silicon dioxide layer on the surface was manufactured.

In the manufactured exhaust gas purifying filter, the average pore diameter of the porous film became 3.0 μm. In addition, in the formed porous film, the average thickness on the solid portion of the ceramic honeycomb structure was 5 μm, and the average thickness on the hole portion was 11 μm. The silicon dioxide layer having the thickness of 12 nm was formed on the outermost surface of the porous film. The average porosity of the porous film was 51%.

EXAMPLE 6

100 parts by mass of silicon carbide powder having an average particle diameter of 0.6 μm and 2 parts by mass of alumina powder which is the sintering agent having an average particulate diameter of 0.2 μm were mixed, and the ceramic powder ($SiC—Al_2O_3$) consisting of the silicon carbide powder and the alumina powder was obtained.

Next, first, the ceramic powder was put into pure water so that the amount of the ceramic powder was 12 volume %, the amount of water was 87 volume %, and the amount of a gelling agent was 1 volume %, the ceramic powder and the pure water were put into an agitator and mixed over 12 hours at the rotational speed of 60 rpm in a ball mill, and slurry was obtained.

Thereafter, gelatin was added to the slurry as the gelling agent, and these were mixed over 15 minutes, and the coating material for forming the porous film according to Example 6 was obtained.

Next, after the ceramic honeycomb structure (honeycomb filter formed of silicon carbide: DPF, average pore diameter is 12 μm and average porosity is 45% in partition) was immersed into the coating material for forming the porous film, the honeycomb structure was lifted up and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 1700° C. at a speed of 15° C. per minute, the ceramic honeycomb structure was maintained at 1700° C. for 2 hours and sintered, and the porous film configured by sintering the ceramic powder was formed on the surface of the ceramic honeycomb structure.

The ceramic honeycomb structure in which the obtained porous film was formed on the surface was immersed into the application liquid of 0.01% $SiO_2$ solid content in which tetramethoxysilane was partially hydrolyzed, and the honeycomb structure was lifted up and dried at 100° C. over 5 hours under the atmosphere. Thereafter, the ceramic honeycomb structure was put into an electric furnace and was heat-treated at 600° C. over 60 hours under the atmosphere, and the exhaust gas purifying filter having the porous film which included the silicon dioxide layer on the surface was manufactured.

In the manufactured exhaust gas purifying filter, the average pore diameter of the porous film became 0.9 μm. In addition, in the formed porous film, the average thickness on the solid portion of the ceramic honeycomb structure was 19 μm, and the average thickness on the hole portion was 40 μm. The silicon dioxide layer having the thickness of 27.0 nm was formed on the outermost surface of the porous film. The average porosity of the porous film was 70%.

EXAMPLE 7

By using the same method as that of Example 6 except that the heat treatment was performed at 500° C. over 2 hours under the atmosphere in the condition for forming the silicon dioxide layer on the surface of the porous film, the exhaust gas purifying filter having the porous film which included the silicon dioxide layer on the surface was manufactured.

In the manufactured exhaust gas purifying filter, the average pore diameter of the porous film became 0.9 μm. In addition, in the formed porous film, the average thickness on the solid portion of the ceramic honeycomb structure was 18 μm, and the average thickness on the hole portion was 41 μm. The silicon dioxide layer having the thickness of 23.0 nm was formed on the outermost surface of the porous film. The average porosity of the porous film was 71%.

EXAMPLE 8

Silicon carbide powder having the average particle diameter of 0.03 μm were heat-treated at 800° C. over 2 hours under the atmosphere, 100 parts by mass of the silicon carbide powder which form the silicon dioxide layer of 3 nm on the surface and 2 parts by mass of the alumina powder which is the sintering agent having the average particulate diameter of 0.2 μm were mixed, and the ceramic powder (($SiC+SiO_2$)—$Al_2O_3$) consisting of the silicon carbide powder and the alumina powder was obtained.

Next, first, the ceramic powder was put into pure water so that the amount of the ceramic powder was 12 volume %, the amount of water was 87 volume %, and the amount of a gelling agent was 1 volume %, the ceramic power and the pure water were put into an agitator and mixed over 12 hours at the rotational speed of 60 rpm in a ball mill, and slurry was obtained.

Thereafter, gelatin was added to the slurry as the gelling agent, and these were mixed over 15 minutes, and the coating material for forming the porous film according to Example 8 was obtained.

Next, after the ceramic honeycomb structure (honeycomb filter formed of silicon carbide: DPF, average pore diameter is 12 μm and average porosity is 45% in partition) was immersed into the coating material for forming the porous film, the honeycomb structure was lifted up and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 1700° C. at a speed of 15° C. per minute, the ceramic honeycomb structure was maintained at 1700° C. for 2 hour and sintered, the porous film configured by sintering the ceramic powder was formed on the surface of the ceramic honeycomb structure, and the exhaust gas purifying filter having the porous film which included the silicon dioxide layer on the surface was manufactured.

In the manufactured exhaust gas purifying filter, the average pore diameter of the porous film became 0.9 μm. In addition, in the formed porous film, the average thickness on the solid portion of the ceramic honeycomb structure was 20 μm, and the average thickness on the hole portion was 42 μm. The silicon dioxide layer having the thickness of 3.0 nm was formed on the outermost surface of the porous film. The average porosity of the porous film was 81%.

COMPARATIVE EXAMPLE 1

Ceramic powder ($SiO_2$), which was configured of silicon dioxide powder/granules having the average particle diameter of 0.03 μm, was prepared. Next, first, the ceramic powder was put into pure water so that the amount of the ceramic powder was 12 volume %, the amount of water was 87 volume %, and the amount of a gelling agent was 1 volume %, the ceramic power and the pure water were put into an agitator and mixed over 12 hours at the rotational speed of 60 rpm in a ball mill, and slurry was obtained.

Thereafter, gelatin was added to the slurry as the gelling agent, and these were mixed over 15 minutes, and the coating material for forming the porous film according to Comparative Example 1 was obtained.

Next, after the ceramic honeycomb structure (honeycomb filter formed of silicon carbide: DPF, average pore diameter is 12 μm and average porosity is 45% in partition) was immersed into the coating material for forming the porous film, the honeycomb structure was lifted up and dried at 100° C. over 12 hours. Thereafter, the ceramic honeycomb structure on which the ceramic powder is coated was heat-treated at 800° C. over 6 hours in the atmosphere, and therefore, the exhaust gas purifying filter having the porous film which included the silicon dioxide particles was manufactured.

In the manufactured exhaust gas purifying filter, the average pore diameter of the porous film became 0.14 μm. In addition, in the formed porous film, the average thickness on the solid portion of the ceramic honeycomb structure was 12 μm, and the average thickness on the hole portion was 43 μm. The average porosity of the porous film was 86%.

COMPARATIVE EXAMPLE 2

100 parts by mass of the silicon carbide powder having the average particle diameter of 0.1 μm and 1 part by mass of boron carbide powder which is the sintering agent having the average particulate diameter of 0.8 μm were mixed, and the ceramic powder (SiC—B$_4$C) consisting of the silicon carbide powder and the boron carbide powder was obtained.

Next, first, the ceramic powder was put into pure water so that the amount of the ceramic powder was 8.0 volume %, the amount of water was 91.0 volume %, and the amount of a gelling agent was 1 volume %, the ceramic powder and the pure water were put into an agitator and mixed over 12 hours at the rotational speed of 60 rpm in a ball mill, and slurry was obtained.

Thereafter, gelatin was added to the slurry as the gelling agent, and these were mixed over 15 minutes, and the coating material for forming the porous film according to Comparative Example 2 was obtained.

Next, after the ceramic honeycomb structure (honeycomb filter formed of silicon carbide: DPF, average pore diameter is 12 μm and average porosity is 45% in partition) was immersed into the coating material for forming the porous film over 3 minutes, the honeycomb structure was lifted and dried at 100° C. over 12 hours. Thereafter, the ceramic honeycomb structure on which the ceramic powder is coated was put into an atmosphere furnace, the atmosphere in the furnace was an argon atmosphere, the temperature in the furnace was increased up to 2000° C. at a speed of 15° C. per minute, the ceramic honeycomb structure was maintained at 2000° C. for 30 minutes and sintered, and the porous film configured by sintering the ceramic powder was formed on the surface of the ceramic honeycomb structure.

In the exhaust gas purifying filter obtained by the above-described step, the average pore diameter of the porous film became 0.3 μm. In addition, in the formed porous film, the average thickness on the solid portion of the ceramic honeycomb structure was 24 μm, and the average thickness on the hole portion was 50 μm. Moreover, the silicon dioxide layer was not formed on the surface of the porous film. The average porosity of the porous film was 80%.

Evaluation results of the samples of the exhaust gas purifying filters obtained according to the Examples and Comparative Examples are shown in Table 1.

TABLE 1

| | Porous Film Composition | Film Thickness (Solid Portion) (μm) | Film Thickness (Hole Portion) (μm) | SiO$_2$ Film Thickness (nm) | Average Pore Diameter (μm) | Pressure Loss Characteristic | PM Combustion Time (second) |
|---|---|---|---|---|---|---|---|
| Example 1 | SiC—Al$_2$O$_3$ | 10 | 18 | 2.0 | 0.08 | Good | 700 |
| Example 2 | SiC | 11 | 20 | 1.5 | 1.1 | Good | 900 |
| Example 3 | SiC—Y$_2$O$_3$ | 10 | 15 | 2.0 | 1.6 | Good | 1100 |
| Example 4 | SiC—Y$_2$O$_3$ | 21 | 35 | 0.6 | 2.0 | Good | 1300 |
| Example 5 | SiC—B$_4$C | 5 | 11 | 12.0 | 3.0 | Good | 1500 |
| Example 6 | SiC—Al$_2$O$_3$ | 19 | 40 | 27.0 | 0.9 | Good | 1300 |
| Example 7 | SiC—Al$_2$O$_3$ | 18 | 41 | 23.0 | 0.9 | Good | 1300 |
| Example 8 | (SiC + SiO$_2$)—Al$_2$O$_3$ | 20 | 42 | 3.0 | 0.9 | Good | 1200 |
| Comparative Example 1 | SiO$_2$ | 12 | 43 | — | 0.14 | Poor | 2100 |
| Comparative Example 2 | SiC—B$_4$C | 24 | 50 | — | 0.3 | Poor | 2200 |

According to evaluation results shown in Table 1, in the exhaust gas purifying filters of Examples 1 to 8 with respect to the exhaust gas purifying filters of Comparative Examples 1 and 2 in which the silicon dioxide layer was not formed, the combustion time of the particular matter can be shortened, and it was proved that the filters of Examples 1 to 8 became the exhaust gas purifying filter having good characteristics. In addition, it was proved that the exhaust gas purifying filters of Examples 1 to 8 had better characteristics than those of Comparative Examples 1 and 2 in the pressure loss characteristic.

In addition, good results were obtained in all Examples 1 to 8. Particularly, better results were obtained in those (Examples 1 to 5) in which the silicon dioxide layer was formed by oxidizing the outer surface of the porous film after the porous film including mainly the silicon carbide was burned compared to those (Examples 6 and 7) in which the silicon dioxide layer was formed by the liquid phase method. Moreover, among Examples, in those (Examples 1 to 3, and 8) in which the thickness of the silicon dioxide layer was 1 nm or more and 10 nm or less, better combustion test results were obtained.

INDUSTRIAL APPLICABILITY

In the exhaust gas purifying filter of the present invention, it is possible to suppress an increase of a pressure loss while maintaining collection efficiency of the particulate matter. In addition, an interval of the regenerating cycle of the filter can be lengthened, and the regeneration frequency can be decreased. Therefore, the present invention is industrially very useful.

REFERENCE SIGNS LIST

10: DPF, 11: filter substrate, 12: gas passage, 12A: inflow cell, 12B: outflow cell, 13: porous film, 14: partition, 30: particulate matter, α, β: end surface, G: exhaust gas, C: purified gas, H: hole portion, S: solid portion, F, F': exhaust gas passage or combustion gas passage which is formed in the porous film on hole portion, P, P': exhaust gas passage or combustion gas passage which is formed in the porous film on solid portion, X, X': portion in which gas passage is not formed.

We claim:

1. An exhaust gas purifying filter comprising
an inflow section into which exhaust gas including particulate matter flows,
an exhaust section in which purified gas exits the exhaust gas purifying filter, and
a filter substrate which is constructed of a porous body,
wherein the filter substrate includes porous partitions and gas passages which are enclosed by the partitions,
a porous film, which includes silicon carbide particles and pores having a smaller pore diameter than the pores of the partitions, is provided on the surface of the partitions, the pores existing in an outer surface portion and an inner portion of the porous film,
a silicon dioxide layer is formed on a surface of silicon carbide particles which configure the outer surface portion of the porous film,
the gas passage is constructed of a structure in which an upstream side end and a downstream side end are alternately occluded when viewed from a flow direction of the exhaust gas, a cell in which the upstream side end is opened is an inflow cell, and the porous film is formed on an inner wall surface of the porous partition constructing the inflow cell,
a thickness of the silicon dioxide layer is 0.5 nm or more and 30 nm or less, and wherein the porous film is obtained by oxidizing a sintered body of the silicon carbide particles.

2. The exhaust gas purifying filter according to claim 1, wherein the silicon dioxide layer is formed on a surface of silicon carbide particles which configure the outer surface portion of the porous film and on a surface of silicon carbide particles of the inner portions of the porous film which contacts the exhaust gas when the exhaust gas flows in the porous film.

3. The exhaust gas purifying filter according to claim 1, wherein the silicon dioxide layer is a layer which is formed by oxidizing a surface of the silicon carbide particles configuring the porous film.

4. The exhaust gas purifying filter according to claim 1, wherein the silicon dioxide layer is a layer which is formed of a silane compound which is coated, impregnated, or adsorbed on the porous film.

5. The exhaust gas purifying filter according to claim 1, wherein the porous film is obtained by sintering silicon carbide particles which include the silicon dioxide layer on the surface.

6. The exhaust gas purifying filter according to claim 2, wherein the silicon dioxide layer is a layer which is formed by oxidizing a surface of the silicon carbide particles configuring the porous film.

7. The exhaust gas purifying filter according to claim 2, wherein the silicon dioxide layer is a layer which is formed of a silane compound which is coated, impregnated, or adsorbed on the porous film.

8. The exhaust gas purifying filter according to claim 2, wherein the porous film is obtained by sintering silicon carbide particles which include the silicon dioxide layer on the surface.

9. The exhaust gas purifying filter according to claim 1, wherein an average pore diameter of the porous film is more than 0.05 μm and 3 μm or less.

10. The exhaust gas purifying filter according to claim 2, wherein an average pore diameter of the porous film is more than 0.05 μm and 3 μm or less.

11. The exhaust gas purifying filter according to claim 1, wherein the filter substrate is a honeycomb structure which is configured of heat-resistant porous ceramic selected from the group consisting of silicon carbide, cordierite, aluminum titanate, and silicon nitride.

12. The exhaust gas purifying filter according to claim 1, wherein the particles which form the porous film is any one of (1) the particles which are configured of only the silicon carbide, (2) the particles of the silicon carbide complexed with the components other than the silicon carbide, an element of at least one kind selected from group 3 to group 14 or an oxide, a carbide, and a nitride thereof, (3) a composite of the particles which are configured of only the silicon carbide and the particles which are configured of the components other than the silicon carbide, an element of at least one kind selected from group 3 to group 14 or an oxide, a carbide, and a nitride thereof, and (4) a composite of the particles of the silicon carbide complexed with the components other than the silicon carbide, an element of at least one kind selected from group 3 to group 14 or an oxide, a carbide, and a nitride thereof and the particles which is configured of the components other than the silicon carbide, an element of at least one kind selected from group 3 to group 14 or an oxide, a carbide, and a nitride thereof.

13. The exhaust gas purifying filter according to claim 1, wherein the silicon dioxide layer is present within a range of from 2 volume % to 50 volume % in terms of a volume ratio of the silicon dioxide layer in the porous film.

14. The exhaust gas purifying filter according to claim 1, wherein the thickness of the porous film is 60 μm or less in a portion which is planarly overlapped with a hole portion which is included in the partition in the inner wall surface, and ranges from 5 μm to 60 μm in a place which is planarly overlapped with a solid portion of the partition in the inner wall surface.

* * * * *